US012094432B1

(12) United States Patent
Furihata et al.

(10) Patent No.: US 12,094,432 B1
(45) Date of Patent: Sep. 17, 2024

(54) DEVICE AND METHOD FOR PIXEL LUMINANCE COMPENSATION FOR DISPLAY DEVICES WITH BACKLIGHT LIGHT SOURCE ARRAY

(71) Applicant: Synaptics Incorporated, San Jose, CA (US)

(72) Inventors: Hirobumi Furihata, Tokyo (JP); Takashi Nose, Kanagawa (JP); Kazutoshi Aogaki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/205,491

(22) Filed: Jun. 2, 2023

(51) Int. Cl.
*G09G 3/36* (2006.01)
*G09G 3/34* (2006.01)

(52) U.S. Cl.
CPC ......... *G09G 3/3607* (2013.01); *G09G 3/3426* (2013.01); *G09G 2320/0233* (2013.01)

(58) Field of Classification Search
CPC ... G09G 3/3607; G09G 3/3426; G09G 3/3413
See application file for complete search history.

(56) References Cited

U.S. PATENT DOCUMENTS 11,281,047 B1 * 3/2022 Dunn .................. G09G 3/3426
11,929,041 B1 * 3/2024 Huang ................ G09G 3/3426

* cited by examiner

*Primary Examiner* — Sardis F Azongha
(74) *Attorney, Agent, or Firm* — Leydig, Voit & Mayer, Ltd.

(57) ABSTRACT

A display device includes a display panel, a backlight module, and a display driver. The backlight module includes a plurality of light sources to illuminate a plurality of zones defined for the display panel. The display driver is configured to store a first light source arrangement type of a first zone of the plurality of zones. The first light source arrangement type is based on an arrangement of one or more light sources with respect to the first zone. The display driver is further configured to process first input pixel data for a first target pixel of the display panel based on the first light source arrangement type of the first zone to generate first output pixel data. The first target pixel is located in the first zone. The display driver is further configured to update the first target pixel based on the first output pixel data.

20 Claims, 22 Drawing Sheets

DEVICE AND METHOD FOR PIXEL LUMINANCE COMPENSATION FOR DISPLAY DEVICES WITH BACKLIGHT LIGHT SOURCE ARRAY

FIELD

The disclosed technology generally relates to display devices, more particularly, to pixel luminance compensation for display devices with backlight light source array.

BACKGROUND

Display devices with a light-transmissive display panel, such as a light-transmissive liquid crystal display (LCD) panel, incorporate a backlighting system to illuminate the light-transmissive display panel. Modern backlighting systems (e.g., direct-lit backlighting, full array backlighting etc.) may illuminate a display panel with an array of light sources (such as light emitting diodes (LEDs)) disposed directly behind the display panel. Use of an array of light sources for backlighting facilitates local dimming, which may provide brighter or darker portions on the display image to enhance the contrast of the display image.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In general, in one aspect, one or more embodiments relate to a display device. The display device includes a display panel, a backlight module, and a display driver. The backlight module includes a plurality of light sources to illuminate a plurality of zones defined for the display panel. The display driver is configured to store a first light source arrangement type of a first zone of the plurality of zones. The first light source arrangement type is based at least in part on an arrangement of one or more light sources of the plurality of light sources with respect to the first zone. The display driver is further configured to process first input pixel data for a first target pixel of the display panel based at least in part on the first light source arrangement type of the first zone to generate first output pixel data for the first target pixel. The first target pixel is located in the first zone. The display driver is further configured to update the first target pixel based on the first output pixel data.

In general, in one aspect, one or more embodiments relate to a display driver. The display driver includes a light source brightness compensation block and driver circuitry. The light source brightness compensation block is configured to store a first light source arrangement type of a first zone of a plurality of zones defined for a display panel illuminated by a backlight module comprising a plurality of light sources to illuminate the plurality of zones. The first light source arrangement type is based at least in part on an arrangement of one or more light sources of the plurality of light sources with respect to the first zone. The light source brightness compensation block is further configured to process first input pixel data for a first target pixel of the display panel based at least in part on the first light source arrangement type of the first zone to generate first output pixel data for the first target pixel. The first target pixel is located in the first zone. The driver circuitry is configured to update the first target pixel based on the first output pixel data.

In general, in one aspect, one or more embodiments relate to a method for driving a display panel. The method includes storing a first light source arrangement type of a first zone of a plurality of zones defined for a display panel illuminated by a backlight module comprising a plurality of light sources to illuminate the plurality of zones. The first light source arrangement type is based at least in part on an arrangement of one or more light sources of the plurality of light sources with respect to the first zone. The method further includes processing first input pixel data for a first target pixel of the display panel based at least in part on the first light source arrangement type of the first zone to generate first output pixel data for the first target pixel. The first target pixel is located in the first zone. The method further includes updating the first target pixel based on the first output pixel data.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
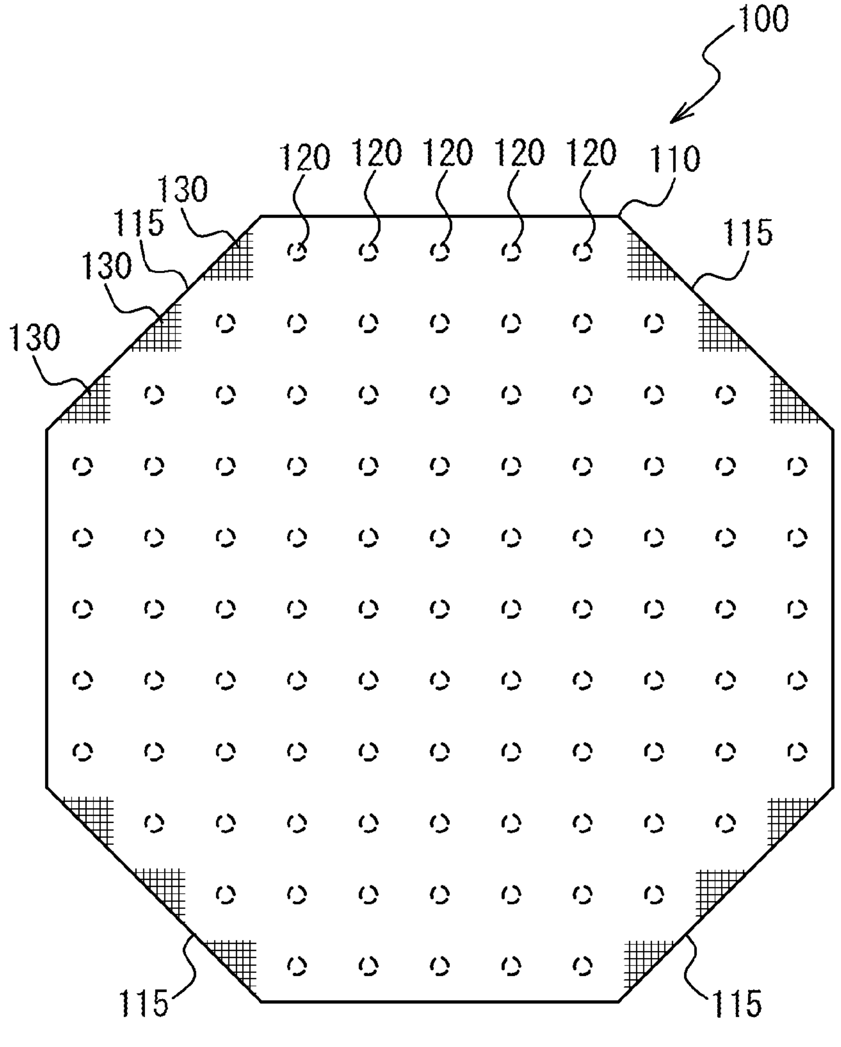
FIG. 1 shows an example display device that includes a display panel illuminated by an array of light sources.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Display devices with a light-transmissive display panel, such as a light-transmissive liquid crystal display (LCD) panel, may be configured to illuminate the display panel with an array of light sources (such as light emitting diodes (LEDs)) disposed directly behind the display panel. Such backlighting technologies may be referred to as direct-lit backlighting or full array backlighting. The light sources may be each configured to illuminate corresponding regions or zones of the display panel. The light sources may be individually controlled to achieve "local dimming", which may provide brighter or darker portions on the display image to enhance the image contrast.

One issue is that the light sources of the backlighting system are not necessarily ideally arranged to uniformly illuminate the display panel due to restrictions on the space to accommodate the backlighting system. In some cases, a housing that accommodates the display panel and the backlighting system may not be configured to provide sufficient space to arrange a desired number of light sources near an edge of the display panel. The issue of lack of sufficient space to accommodate the backlighting system may be severe especially in miniaturized display devices, such as head mounted display (HMD) devices used for extended reality (XR) applications (including virtual reality (VR), augmented reality (AR), and merged reality (MR), among other examples).

The present disclosure provides various technologies for mitigating image brightness non-uniformity which is potentially caused by a non-ideal arrangement of light sources that illuminate a display panel. In one or more embodiments, a display device includes a display panel, a backlight module, and a display driver. The backlight module may include a plurality of light sources to illuminate a plurality of zones defined for the display panel. The display driver is configured to store a light source arrangement type for a zone of interest of the plurality of zones. The display driver is further configured to process input pixel data for a target pixel located in the zone of interest based at least in part on the light source arrangement type of the zone of interest to generate output pixel data for the target pixel. The display driver is further configured to update the target pixel based on the output pixel data. Processing the input pixel data based on the stored light source arrangement type may effectively compensate for image brightness non-uniformity which may be caused by a non-ideal arrangement of the light sources. In one implementation, a compensation coefficient for the target pixel may be determined based at least in part on the light source arrangement type of the zone of interest, and the output pixel data may be generated by applying the compensation coefficient to the input pixel data. In the following, a description is given of various specific embodiments for pixel luminance compensation to mitigate image brightness non-uniformity which is potentially caused by a non-ideal arrangement of light sources that illuminate a display panel.

FIG. 1 shows an example display device 100 that includes a display panel 110 illuminated by an array of light sources 120. It is noted that the light sources 120 are indicated in phantom since the light sources 120 are actually located behind the display panel 110. In the shown example, the four corners 115 of the display panel 110 are beveled and the corners of the array of the light sources 120 are also beveled in accordance with the shape of the display panel 110. When the display device 100 is of a decreased size, a housing (not shown) of the display device 100 may be configured to provide only limited space behind the display panel 110, making it difficult to arrange light sources at the beveled corners 115. A non-ideal arrangement of light sources, which does not uniformly illuminate the display panel 110, may cause undesired image brightness non-uniformity. For example, the light source arrangement of FIG. 1 may generate dark or dim areas 130 at the beveled corners 115 of the display panel 110.

Figure 2:
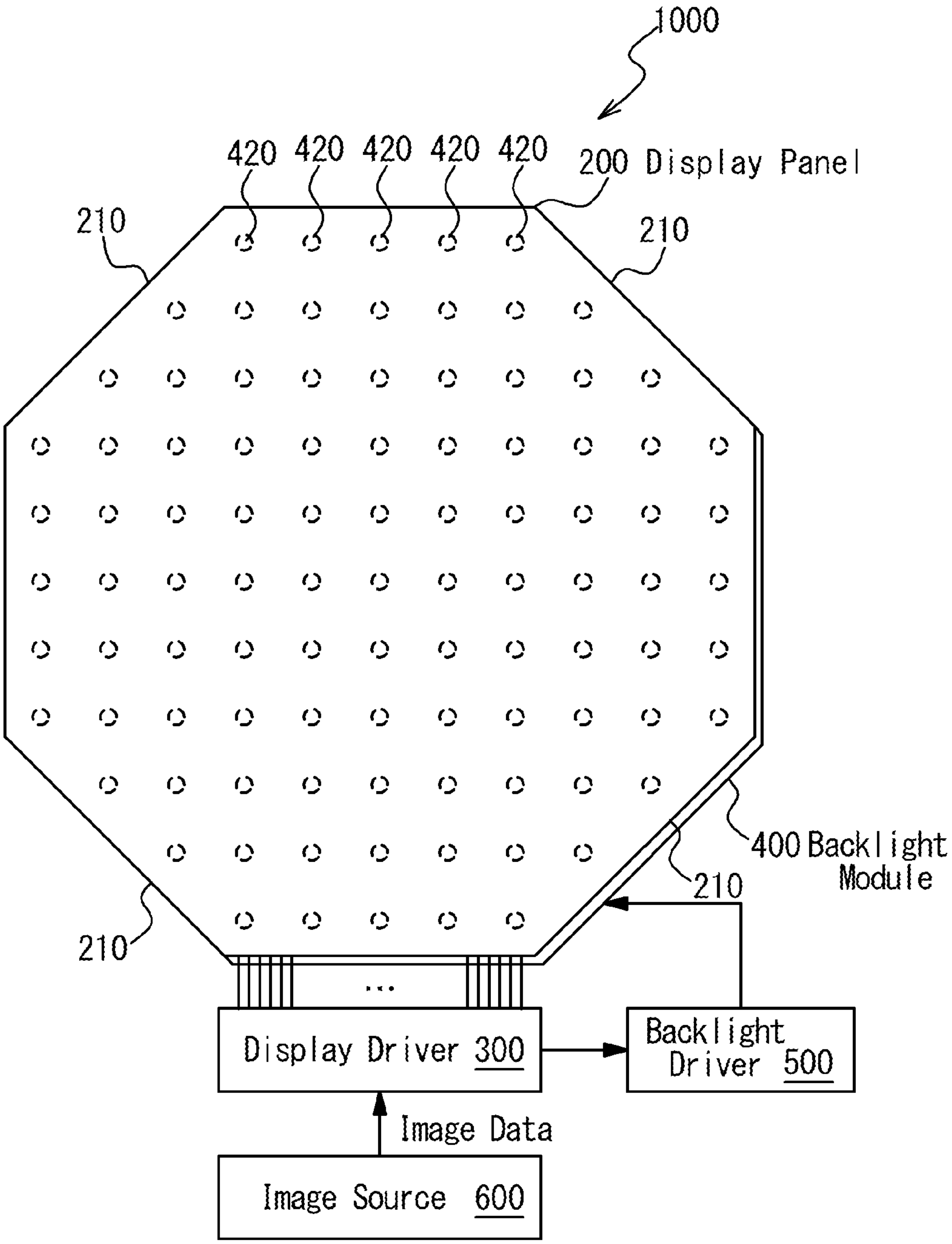
FIG. 2 shows an example configuration of a display device, according to one or more embodiments.

FIG. 2 shows an example configuration of a display device 1000, according to one or more embodiments. The display device 1000 includes a display panel 200 and is configured to display desired images on the display panel 200. The display panel 200 may be a light-transmissive display panel, such as an LCD panel. In the shown embodiment, the display panel 200 is in a rectangular shape with beveled corners 210. In other embodiments, the display panel 200 may have a different shape (e.g., a rectangular shape with or without one or more notches, an oval shape, a hexagon shape, or an octagon shape.)

The display device 1000 further includes a display driver 300 and a backlight module 400, and a backlight driver 500. The display driver 300 is configured to receive image data from an image source 600 and drive the display panel 200 to display an image corresponding to the image data. The image source 600 may be a processor such as an application processor, a host, a central processing unit (CPU), a microprocessor unit (MPU) or a different type of processor configured to provide the image data.

Figure 3:
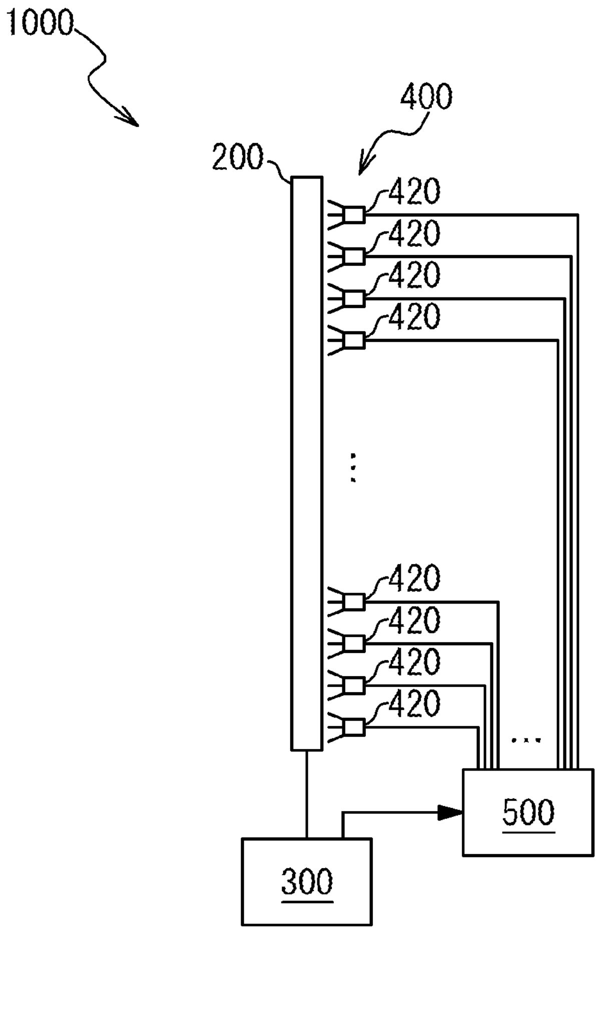
FIG. 3 shows a side view showing the example configuration of the display device of FIG. 2, according to one or more embodiments.

The backlight module 400 and the backlight driver 500 forms a backlighting system. The backlight module 400 is configured to illuminate the display panel 200 with an array of light sources 420. Since the light sources 420 are positioned behind the display panel 200 as shown in FIG. 3, the light sources 420 are shown in phantom in FIG. 2. The light sources 420 are located directly behind the display panel 200 to oppose the display panel 200 and configured to illuminate corresponding zones or regions of the display panel 200. In the shown embodiment, the light sources 420 are spaced with regular intervals to illuminate the display panel 200 as uniformly as possible. In one implementation, each light source 420 includes one or more LEDs. In an alternative implementation, each light source 420 may include a different type of light source. While FIG. 2 shows 97 light sources 420, a skilled person would appreciate that the backlight module 400 may include more or less than 97 light sources 420. The backlight driver 500 is configured to drive the light sources 420 of the backlight module 400 under the control of the display driver 300 so that each light source 420 emits light with luminance specified by the display driver 300.

In the embodiment shown in FIG. 2, the light sources 420 are arranged in an array with beveled corners in accordance with the shape of the display panel 200 with the beveled corners 210. As discussed in relation to FIG. 1, such arrangement of the light sources 420 may potentially cause image brightness non-uniformity, generating dark or dim areas at the beveled corners 210 of the display panel 200. To mitigate or eliminate the image brightness non-uniformity potentially caused by the arrangement of the light sources 420, the display driver 300 is configured to process the image data to compensate for the image brightness non-uniformity.

Figure 4:
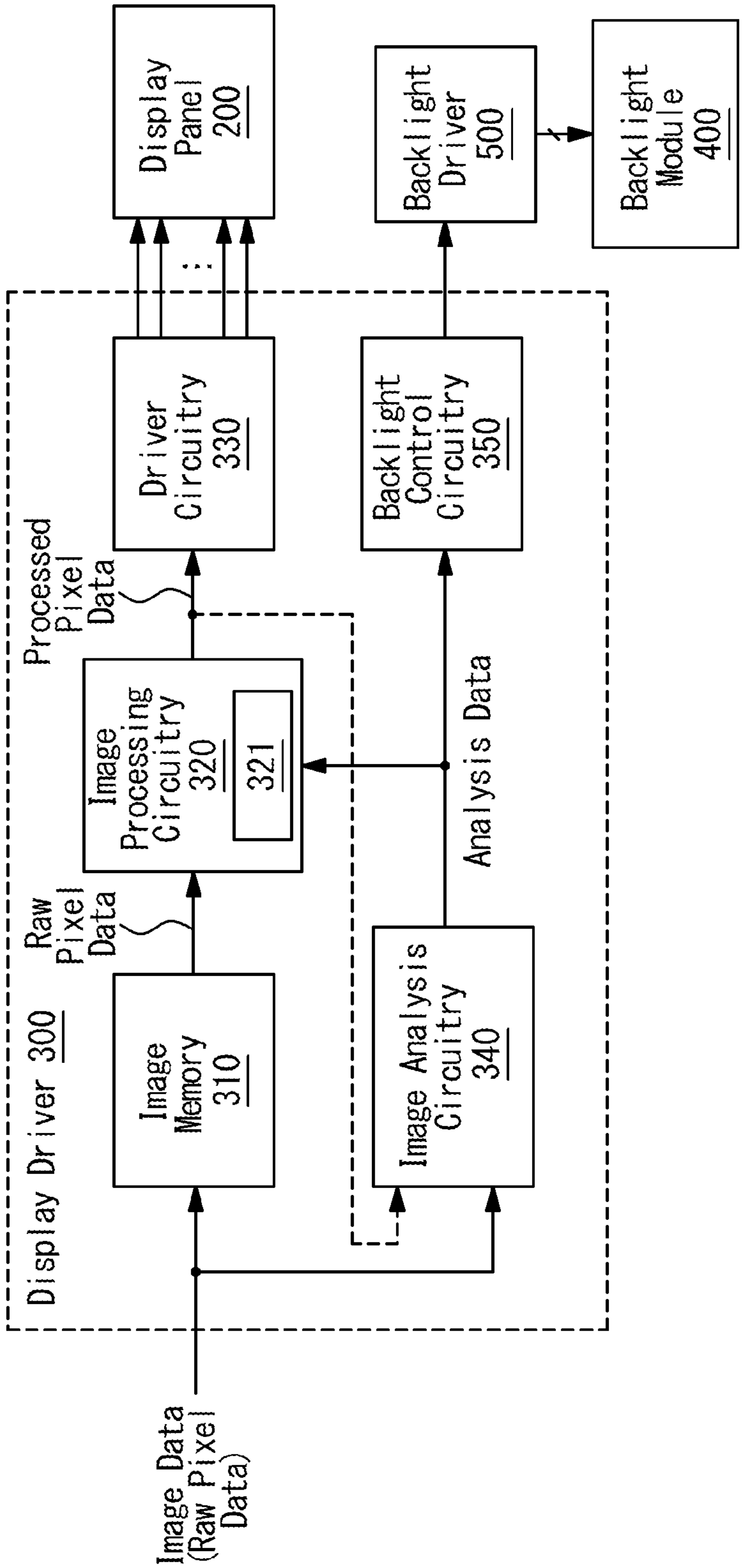
FIG. 4 shows an example configuration of a display driver, according to one or more embodiments.

FIG. 4 shows an example configuration of the display driver 300, according to one or more embodiments. In the shown embodiment, the display driver 300 includes an image memory 310, image processing circuitry 320, driver circuitry 330, image analysis circuitry 340, and backlight control circuitry 350.

The image memory 310 is configured to receive image data corresponding to a display image to be displayed on the display panel 200 from the image source 600 (shown in FIG. 2) and store therein the received image data. In one implementation, the image data includes raw pixel data for respective pixels of the display panel 200. In one implementation, raw pixel data for each pixel may include gray levels of respective primitive colors (e.g., red (R), green (G), and blue (B)). In one implementation, each pixel of the display panel 200 may include R, G, and B subpixels configured to display red, green, and blue colors, respectively, and raw pixel data for each pixel may include R, G, and B gray levels that specify luminance of the R, G, and B subpixels, respectively. In an alternative embodiment, the image memory 310 may be omitted and the raw pixel data may be directly provided to the image processing circuitry 320.

The image processing circuitry 320 is configured to apply image processing to the raw pixel data retrieved from the image memory 310 to generate processed pixel data. The image processing circuitry 320 includes a light source brightness compensation block 321 configured to perform pixel luminance compensation for mitigating the image brightness non-uniformity potentially caused by the non-ideal arrangement of the light sources 420 that illuminate the display panel 200 as discussed above in relation to FIGS. 1 and 2. The details of the pixel luminance compensation will be described later in detail. The image processing performed by the image processing circuitry 320 may further include color adjustment, demura correction, deburn correction, image scaling, gamma transformation, or other image processes.

The driver circuitry 330 is configured to receive the processed pixel data from the image processing circuitry 320 and drive or update the pixels of the display panel 200 based at least in part on the processed pixel data. The driver circuitry 330 may include a source driver (also referred to as data driver) configured to generate data voltages based on the processed pixel data and drive source lines (also referred to as data lines) of the display panel 200 to program or update the pixels of the display panel 200 with the generated data voltages. In one implementation, each pixel in the display panel 200 may include R, G, and B subpixels and the processed pixel data may specify the luminance level of each of the R, G, and B subpixels of each pixel. The driver circuitry 330 may be configured to program or update the R, G, and B subpixels of each pixel based at least in part on the processed pixel data to control the luminance levels of the R, G, and B subpixels.

The image analysis circuitry 340 and the backlight control circuitry 350 are collectively configured to generate and provide backlight control instructions to the backlight driver 500 based at least in part on the image data to control the luminance of the respective light sources 420 (shown in FIGS. 2 and 3) of the backlight module 400. In one embodiment, the raw pixel data is provided to the image analysis circuitry 340. In an alternative embodiment, the processed pixel data generated by the image processing circuitry 320 may be provided to the image analysis circuitry 340 instead of the raw pixel data as indicated by the dotted arrow from the image processing circuitry 320 to the image analysis circuitry 340. The image analysis circuitry 340 is configured to analyze the raw pixel data or the processed pixel data to generate analysis data. The analysis data may indicate a luminance distribution of the display image to be displayed on the display panel 200. The backlight control circuitry 350 is configured to control the luminance of each light source 420 based at least in part on the analysis data. The analysis data may also be provided to the image processing circuitry 320. In such embodiments, the image processing performed by the image processing circuitry 320 may be based on the analysis data. The following is a description of the pixel luminance compensation performed by the image processing circuitry 320 to mitigate the image brightness non-uniformity potentially caused by the non-ideal arrangement of the light sources 420.

Figure 5:
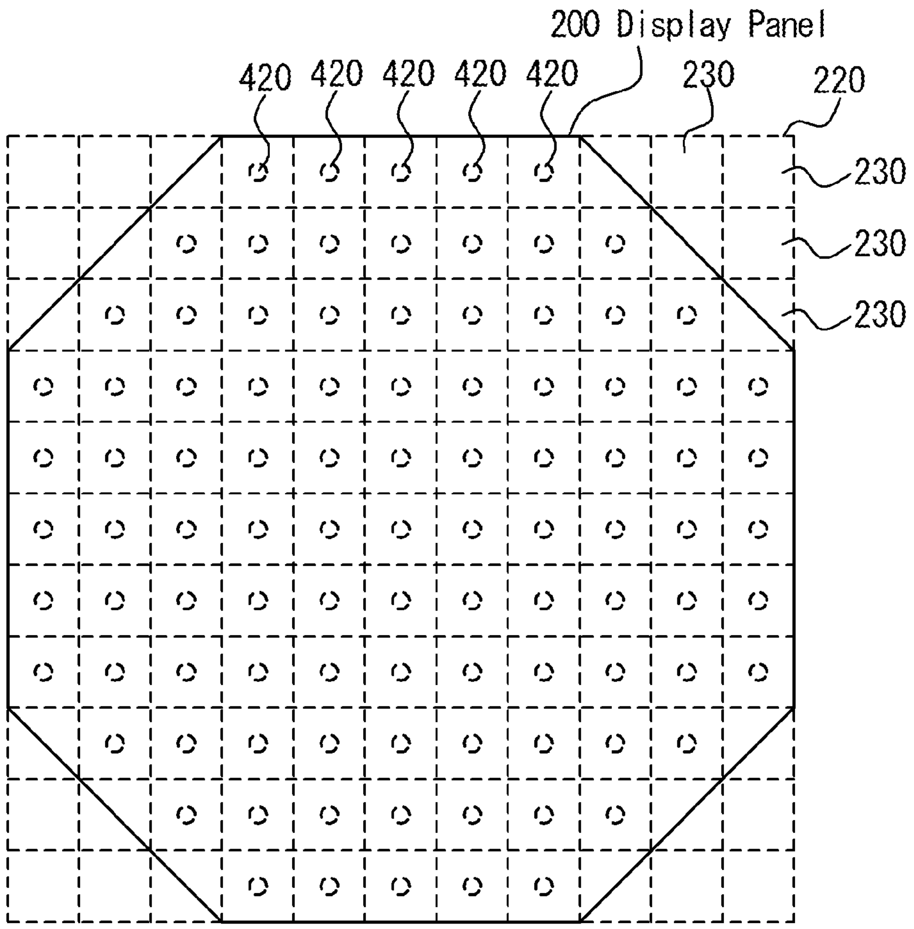
FIG. 5 shows an example definition of "zones" for a display panel, according to one or more embodiments.
Figure 6:
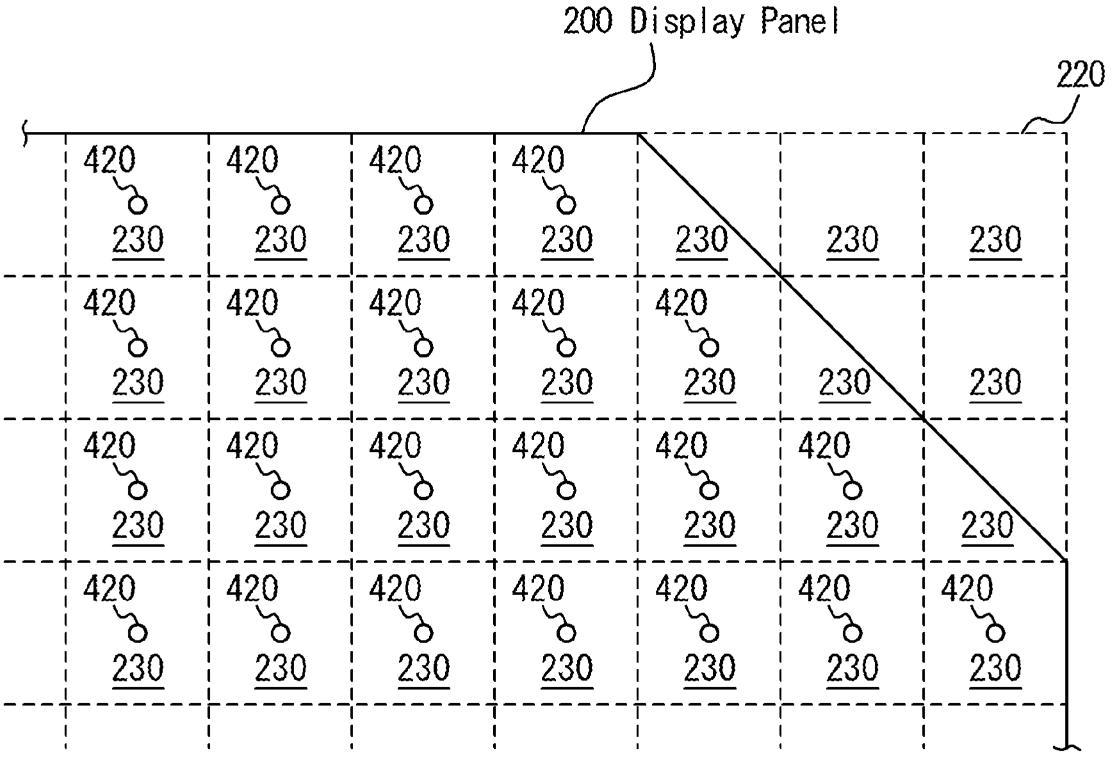
FIG. 6 is an enlarged view showing an example definition of "zones" for a display panel, according to one or more embodiments.

In one or more embodiments, a plurality of "zones" are defined for the display panel 200. The "zones" are used for the image analysis performed by the image analysis circuitry 340 and/or the pixel luminance compensation performed by the light source brightness compensation block 321. FIG. 5 shows an example definition of zones 230 for the display panel 200, according to one or more embodiments. The zones 230 are defined by partitioning a panel-circumscribing area 220 that is defined to circumscribe the display panel 200. In the shown embodiment, the panel-circumscribing area 220 is rectangular. In an alternative embodiment, the panel-circumscribing area 220 may have a different shape. In the shown embodiment, all the zones 230 have a square shape. In an alternative embodiment, the zones 230 may be defined to have a different shape. Each zone 230 is defined such that one light source 420 opposes to the zone 230 at the center (e.g., the geometric center) of the zone 230 or no light source opposes to the zone 230. A light source 420 opposes a zone 230 when the projection of the light source 420 onto the display panel 200 falls within the zone 230. In the shown embodiment, at each of the beveled corners of the display panel 200, there are six zones 230 to which no light sources oppose, as also shown in FIG. 6.

In one or more embodiments, the analysis data generated by the image analysis circuitry 340 may include average picture levels (APL) of the respective zones 230 calculated based on the raw pixel data or the processed pixel data. The APL of a zone 230 may be the average of the luminance levels of the pixels located in the zone 230. In such embodiments, the backlight control circuitry 350 may be configured to control the luminance of each light source 420 based on the APL of the zone 230 to which each light source 420 opposes.

In one or more embodiments, the pixel luminance compensation is achieved using light source arrangement types determined for the respective "zones". The "light source arrangement type" for a certain zone is based on the arrangement of one or more light sources 420 with respect to the zone. In one implementation, the "light source arrangement type" for a zone of interest may indicate presence or absence of a light source 420 which opposes the zone of interest. The "light source arrangement type" for the zone of interest may further indicate the arrangement of one or more light sources 420 which oppose a set of zones adjacent to the zone of interest. The "light source arrangement type" for the zone of interest may be based at least in part on the number of light sources 420 which oppose the zones adjacent to the zone of interest.

In one implementation, the light source brightness compensation block 321 of the image processing circuitry 320 may be configured to perform pixel luminance compensation for each pixel of the display panel based on the light source arrangement type for the zone in which each pixel is located. In one or more embodiments, the light source brightness compensation block 321 may be configured to, when the light source arrangement type for the zone in which a target pixel is located indicates that an increased number of light sources 420 are located around the zone, process pixel data for the target pixel to reduce the pixel luminance of the target pixel. The light source brightness compensation block 321 may be further configured to, when the light source arrangement type indicates absence of a light source 420 that opposes the zone in which the target pixel is located, process pixel data for the target pixel to compensate for reduction in the pixel luminance of the target pixel.

FIGS. 7A, 7B, 7C, and 7D show example light source arrangement types defined for the zones 230 of the display panel 200, according to one or more embodiments. In the shown embodiment, one of four light source arrangement types shown in FIGS. 7A through 7D are selected and defined for each zone 230. In one implementation, the light source arrangement type of a zone 230 of interest is based on presence or absence of a light source 420 that opposes the zone 230 of interest. The light source arrangement type of the zone 230 of interest may further be based on the arrangement of light sources 420 that oppose zones 230 adjacent to the zone 230 of interest.

Figure 7A:
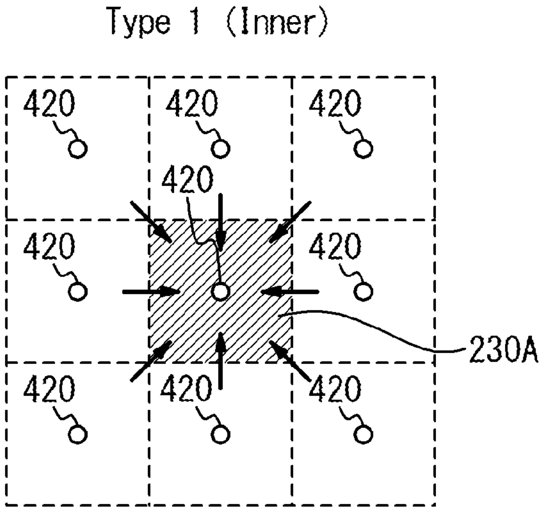
FIGS. 7A, 7B, 7C, and 7D show example light source arrangement types defined for zones of a display panel, according to one or more embodiments.

FIG. 7A shows light source arrangement type "Inner", also referred to as type "1", defined for a zone 230A located in the inner part of the display panel 200. Type "1" indicates that one light source 420 opposes to the zone 230A and eight light sources 420 oppose to the eight zones adjacent to the zone 230A. The pixels in the type "1" zone 230A are mainly illuminated by the light source 420 that opposes to the zone 230A and supplementarily illuminated by the eight light sources 420 that oppose to the eight zones around the type "1" zone 230A.

Figure 7B:
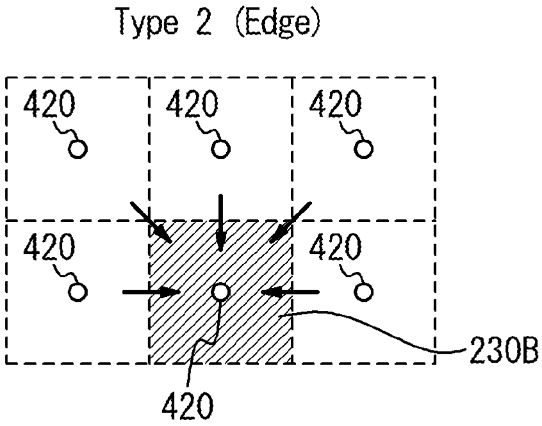

FIG. 7B shows light source arrangement type "Edge", also referred to as type "2", defined for a zone 230B located at an edge of the display panel 200. Type "2" indicates that one light source 420 opposes to the zone 230B and five light sources 420 oppose the five zones adjacent to the zone 230B. The pixels in the type "2" zone 230B are mainly illuminated by the light source 420 opposed to the zone 230B and supplementarily illuminated by the five light sources 420 that oppose to the five zones around the type "2" zone 230B.

Figure 7C:
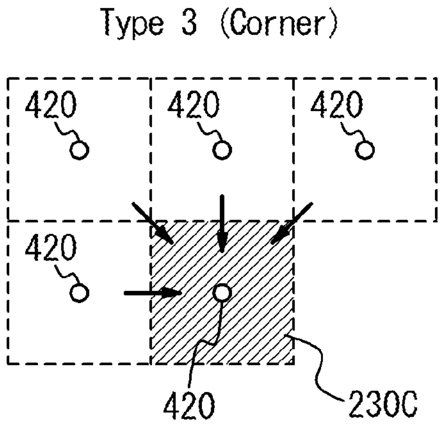

FIG. 7C shows light source arrangement type "Corner", also referred to as type "3", defined for a zone 230C located at a corner of the display panel 200. Type "3" indicates that one light source 420 opposes to the zone 230C and four light sources 420 oppose the four zones adjacent to the zone 230C. The pixels in the type "3" zone 230C are mainly illuminated by the light source 420 opposed to the zone 230C and supplementarily illuminated by the four light sources 420 that oppose to the four zones around the type "3" zone 230C.

Figure 7D:
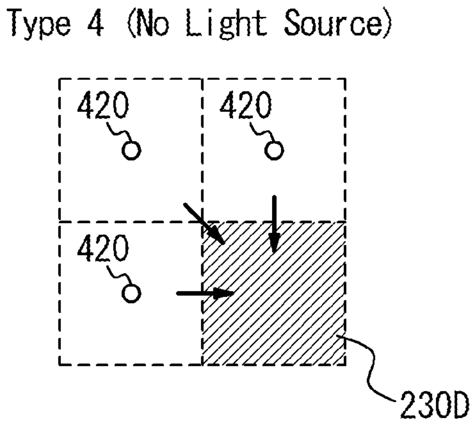

FIG. 7D shows light source arrangement type "No Light Source", also referred to as type "4", defined for a zone 230D to which no light source opposes. Type "4" indicates absence of a light source that opposes to the zone 230D. The pixels in the type "4" zone 230D are illuminated by one or more light sources 420 that oppose to zones adjacent to the type "4" zone 230C, if such light sources 420 exist.

Figure 8:
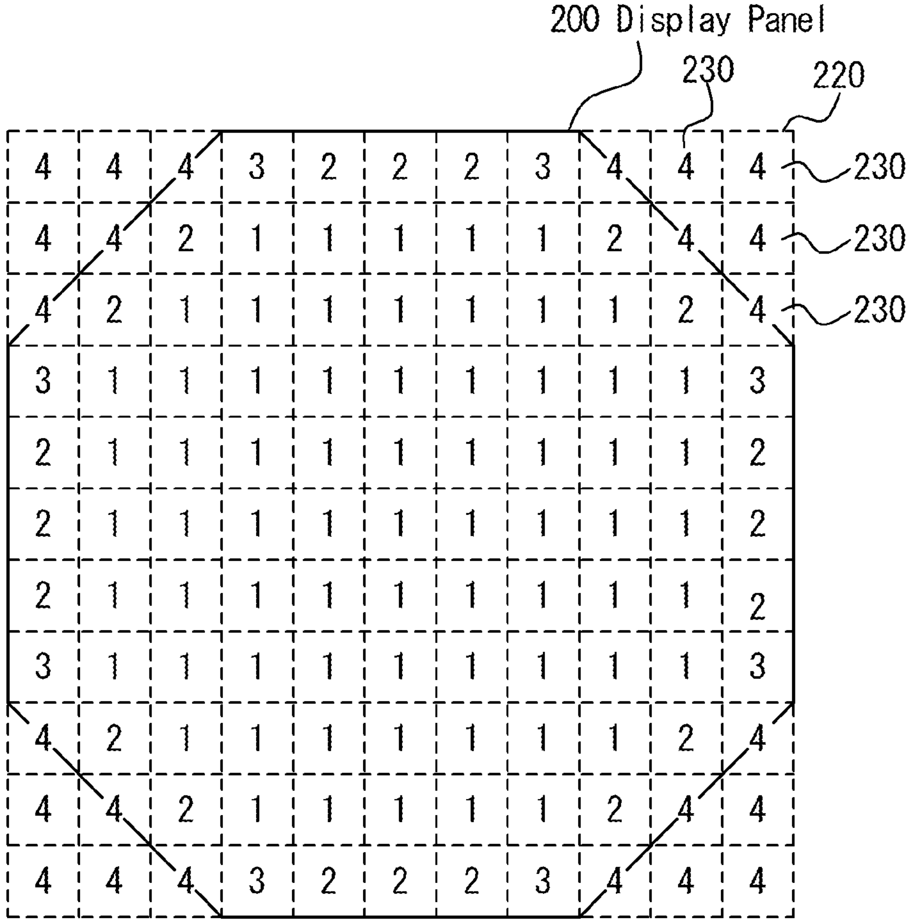
FIG. 8 shows an example definition of light source arrangement types of respective zones of a display panel, according to one or more embodiments.

FIG. 8 shows an example definition of the light source arrangement types of the respective zones 230 of display panel 200 in accordance to FIGS. 7A-7D, according to one or more embodiments. In one or more embodiments, the pixel luminance compensation performed by the image processing circuitry 320 (shown in FIG. 4) is based on the light source arrangement types defined for the respective zones 230 as shown in FIG. 8.

Figure 9:
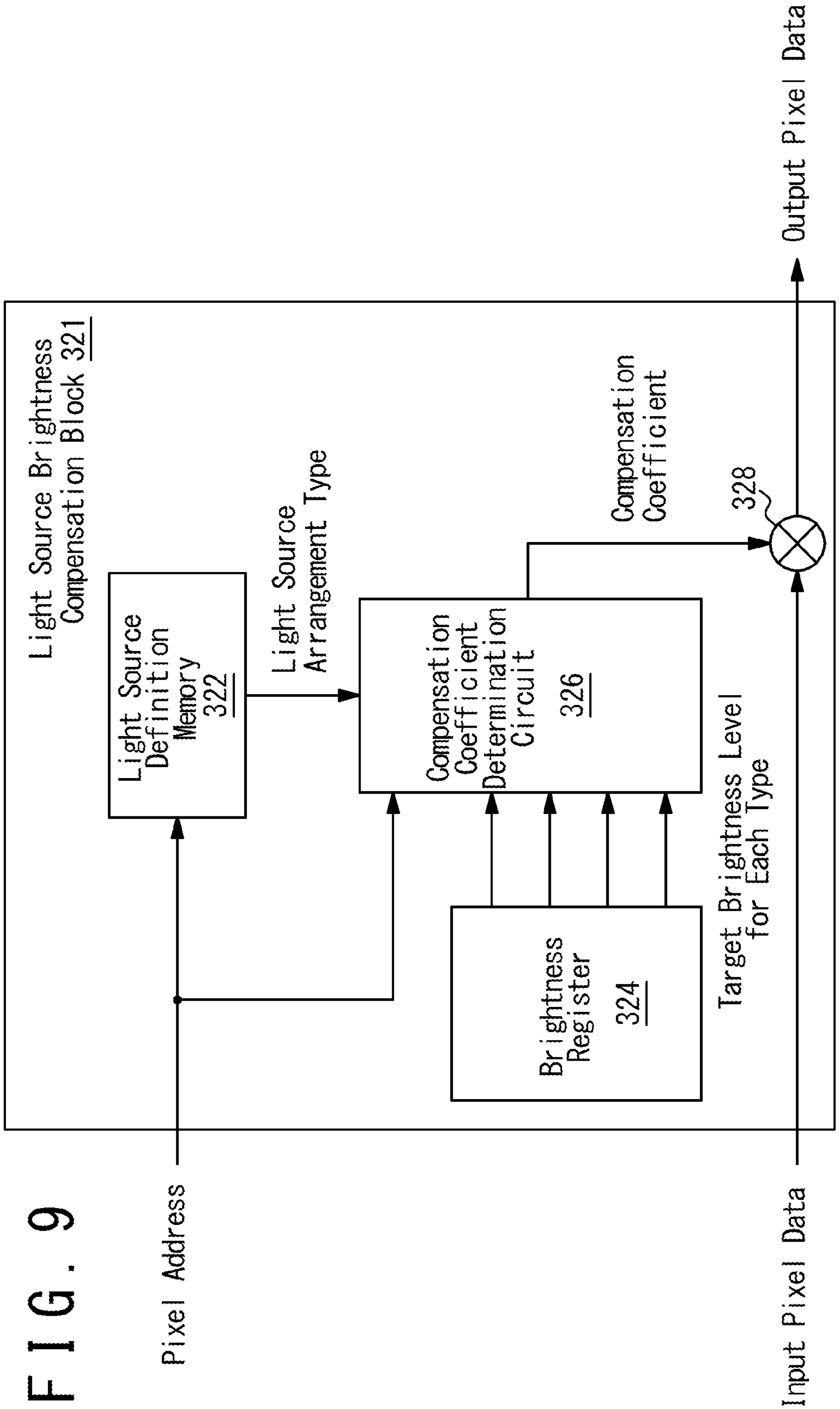
FIG. 9 shows an example configuration of a light source brightness compensation block, according to one or more embodiments.

FIG. 9 shows an example configuration of the light source brightness compensation block 321 (shown in FIG. 4) configured to perform the pixel luminance compensation based on the light source arrangement types defined for the respective zones 230. In the shown embodiment, the light source brightness compensation block 321 is configured to receive input pixel data and apply the pixel luminance compensation to the input pixel data to generate output pixel data. The input pixel data may be the raw pixel data or may be generated by applying one or more other image processes (e.g., color adjustment, demura correction, deburn correction, image scaling) to the raw pixel data in the image processing circuitry 320 (shown in FIG. 4). The output pixel data may be used as the processed pixel data provided to the driver circuitry 330, which is configured to update the pixels of the display panel 200 based on the processed pixel data. Alternatively, the output pixel data may be further processed (e.g., color adjustment, demura correction, deburn correction, image scaling, gamma transformation or other image processes) and then provided to the driver circuitry 330 as the processed pixel data.

In the embodiment shown in FIG. 9, the light source brightness compensation block 321 includes a light source definition memory 322, a brightness register 324, a compensation coefficient determination circuit 326, and a modification circuit 328. The light source definition memory 322 is configured to store the light source arrangement types of the respective zones 230 (shown in FIG. 5) defined for the display panel 200. In the embodiments where four light source arrangement types "1", "2", "3", and "4" are defined as shown in FIGS. 7A-7D and 8, the light source definition memory 322 may be configured to store information indicating one of "1", "2", "3", and "4" for each zone 230.

The brightness register 324 is configured to store target brightness levels for the respective light source arrangement types. The target brightness level for a light source arrangement type may indicate a brightness level to be achieved by the pixel luminance compensation in the zone (more specifically, at the center of the zone) with the light source arrangement type. In one or more embodiments, the target brightness levels stored in the brightness register 324 are normalized to take values between 0 and a predetermined maximum value (e.g., 255), inclusive. In the embodiments where four light source arrangement types "1", "2", "3", and "4" are defined as shown in FIGS. 7A-7D and 8, the brightness register 324 may be configured to store four target brightness levels for the four light source arrangement types "1", "2", "3", and "4", respectively.

The compensation coefficient determination circuit 326 is configured to determine the compensation coefficients for the pixels based on the light source arrangement types stored in the light source definition memory 322. In one implementation, the compensation coefficient determination circuit 326 may be configured to determine the compensation coefficient for a target pixel based on the light source arrangement type of the zone in which the target pixel is located. The compensation coefficient determination circuit 326 may be further configured to determine the compensation coefficient for the target pixel further based on the light source arrangement types of one or more zones adjacent to the zone in which the target pixel is located.

In one or more embodiments, the compensation coefficient determination circuit 326 may be configured to use the target brightness levels stored in the brightness register 324 for the respective light source arrangement types to determine the compensation coefficients for the respective pixels. In one implementation, the compensation coefficient determination circuit 326 may be configured to retrieve from the brightness register 324 the target brightness level for the light source arrangement type of the zone in which the target pixel is located and determine the compensation coefficient for the target pixel based at least in part on the retrieved target brightness level. The compensation coefficient determination circuit 326 may be further configured to retrieve from the brightness register 324 the target brightness levels for the light source arrangement types of the zones adjacent to the zone in which the target pixel is located and determine the compensation coefficient for the target pixel further based on the target brightness levels for the adjacent zones.

Figure 10:
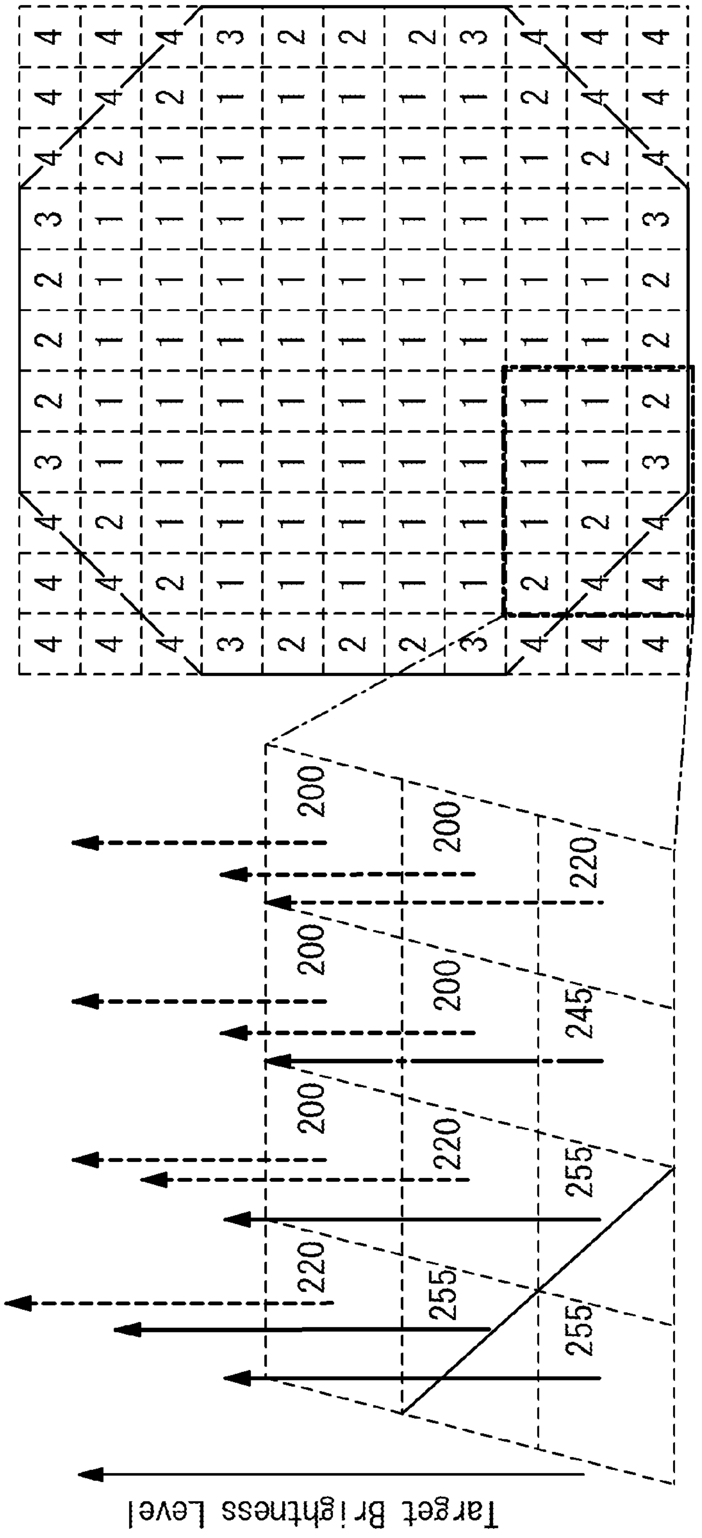
FIG. 10 shows example light source arrangement types and corresponding target brightness levels for 4×3 zones located at the bottom left of a display panel, according to one or more embodiments.

FIG. 10 shows example light source arrangement types and corresponding target brightness levels for 4×3 zones located at the bottom left of the display panel 200, according to one or more embodiments. In the shown embodiments, the target brightness level for the zones with the light source arrangement type "1" is 200 and the target brightness level for the zones with the light source arrangement type "2" is 220, wherein the target brightness levels are normalized to values between 0 and 255, inclusive. Note that the maximum target brightness level is 255. Furthermore, the target brightness level for the zones with the light source arrangement type "3" is 245, and the target brightness level for the zones with the light source arrangement type "4" is 255, i.e., the maximum target brightness level.

The modification circuit 328 is configured to generate the output pixel data for each pixel by applying the compensation coefficient determined for each pixel. In one implementation, the modification circuit 328 may be configured to generate output pixel data for a target pixel by multiplying input pixel data for the target pixel by a compensation coefficient determined for the target pixel. In embodiments where the input pixel data and the output pixel data are both in the RGB format, the R, G, and B gray levels of the output pixel data may be determined by multiplying the R, G, and B gray levels of the input pixel data by the compensation coefficient, respectively. The following is a detailed description of the determination of the compensation coefficient for the target pixel.

In one implementation, the compensation coefficient determination circuit 326 may be configured to determine the compensation coefficient for the target pixel such that the output pixel data for the target pixel is equal to the input pixel data for the target pixel when the stored light source arrangement type of the corresponding zone in which the target pixel is located indicates an absence of a light source that opposes to the corresponding zone. Additionally or alternatively, the compensation coefficient determination circuit 326 may be configured to determine the compensation coefficient for a target pixel such that a gray level (e.g., R, G, or B gray level) of the output pixel data for the target pixel is less than the corresponding gray level (e.g., R, G, or B gray level) of the input pixel data for the target pixel when the light source arrangement type for the corresponding zone in which the target pixel is located indicates the presence of a light source that opposes to the corresponding zone. The compensation coefficient determination circuit 326 may be further configured to determine the compensation coefficient for the target pixel based on the number of light sources that oppose to zones adjacent to the zone in which the target pixel is located. It is noted that the light source arrangement type for the zone in which the target pixel is located indicates the number of light sources that oppose to the adjacent zones. Further details of determining the compensation coefficients according to one or more embodiments are described below.

Figure 11A:
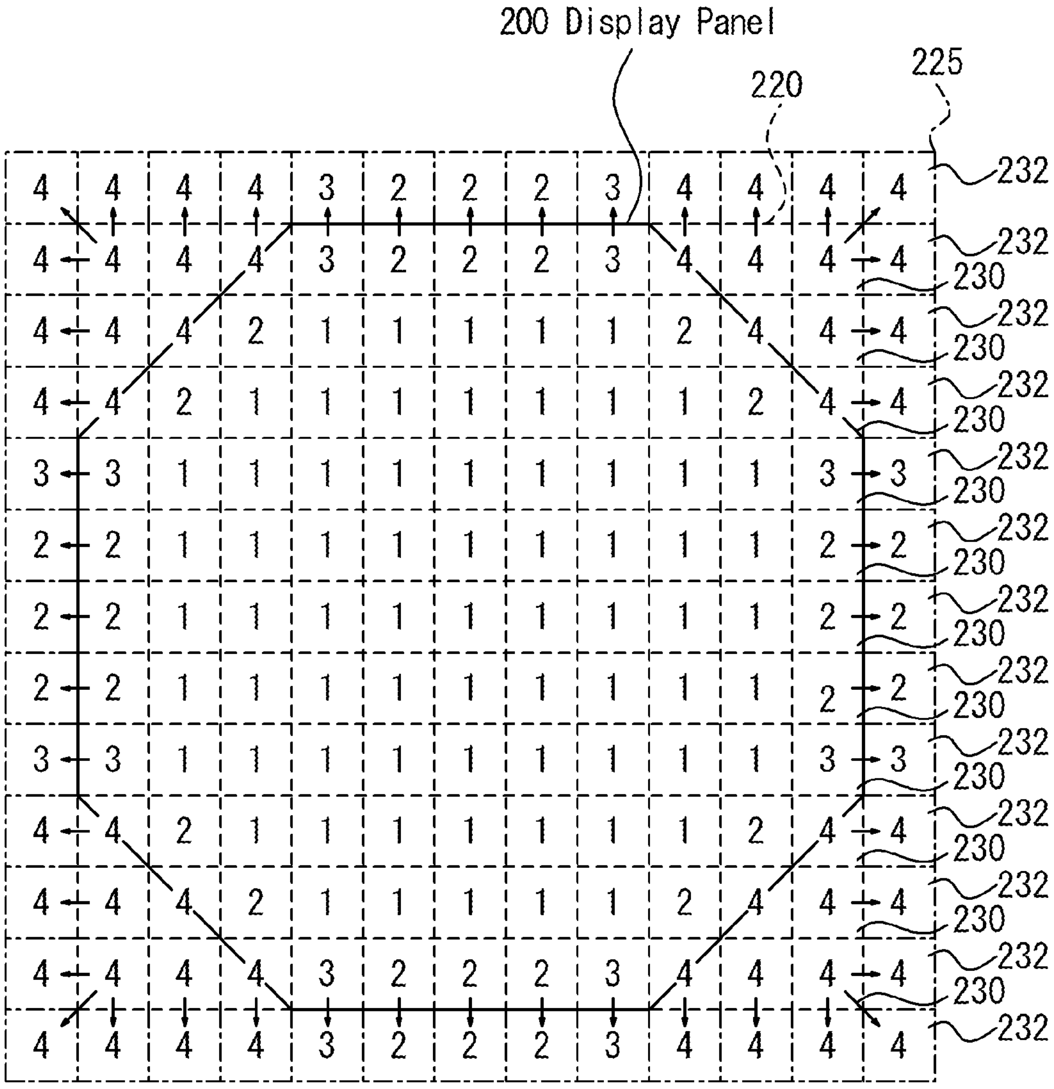
FIG. 11A shows an example "enlarged" panel-circumscribing area and "copied zones" defined for a display panel, according to one or more embodiments.

Referring to FIG. 11A, the compensation coefficient determination circuit 326 may be configured to use an "enlarged" panel-circumscribing area 225 which is defined as the panel-circumscribing area 220 plus a series of "copied zones" 232 surrounding the panel-circumscribing area 220. It should be noted that the enlarged panel-circumscribing area 225 is determined only to facilitate the calculation of the compensation coefficients, including interpolation. The copied zones 232 are "copies" of the outermost zones 230 of the panel-circumscribing area 220, wherein the light source arrangement types of the copied zones 232 are defined to be the same as the light source arrangement types of adjacent ones of the outermost zones 230.

Figure 11B:
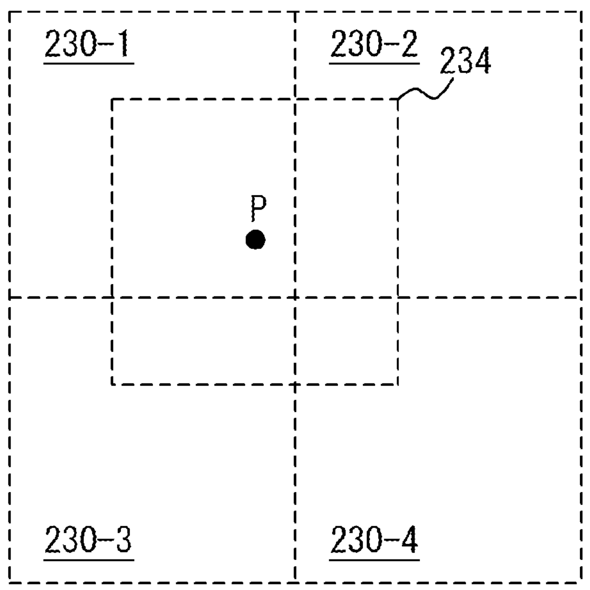
FIG. 11B shows nearby zones identified for a target pixel, according to one or more embodiments.

Referring to FIG. 11B, in one implementation, the compensation coefficient determination circuit 326 may be further configured to identify four "nearby zones" 230-1, 230-2, 230-3, and 230-4 for the target pixel from among the zones 230 and the copied zones 232 and determine the compensation coefficient for the target pixel P based on the light source arrangement types of the "nearby zones" 230-1 to 230-4. The identification of the "nearby zones" 230-1 to 230-4 may be based on the pixel address of the target pixel (see also FIG. 9), where the pixel address indicates the location of the target pixel in the panel-circumscribing area 220 defined for the display panel 200. One of the "nearby zones" 230-1 to 230-4 is the zone 230 in which the target pixel is located and three other nearby zones are three of the zones 230 and the copied zones 232 that are closest to the target pixel. In the shown embodiment, the "nearby zones" 230-1 to 230-4 for the target pixel P are defined by using a reference region 234, which is a square region having the same dimensions as the zones 230, the geometric center of the reference region 235 being located at the target pixel. The "nearby zones" 230-1 to 230-4 may be defined as four of the zones 230 and the copied zones 232 that at least partially overlap the reference region 235. It is noted that one or more of the nearby zones may be copied zones 232 when the target pixel P is located in one of the outermost zones 230.

The compensation coefficient determination circuit 326 may further determine target brightness levels for the respective nearby zones by referring to the brightness register 324, which stores the target brightness levels for the respective light source arrangement types. For example, when the light source arrangement type of a nearby zone of interest is type "1", the target brightness level for the nearby zone of interest may be determined as the target brightness level determined for type "1" (e.g., "200" in the example shown in FIG. 10.) The target brightness level for other nearby zones may be determined in a similar manner.

Figure 11C:
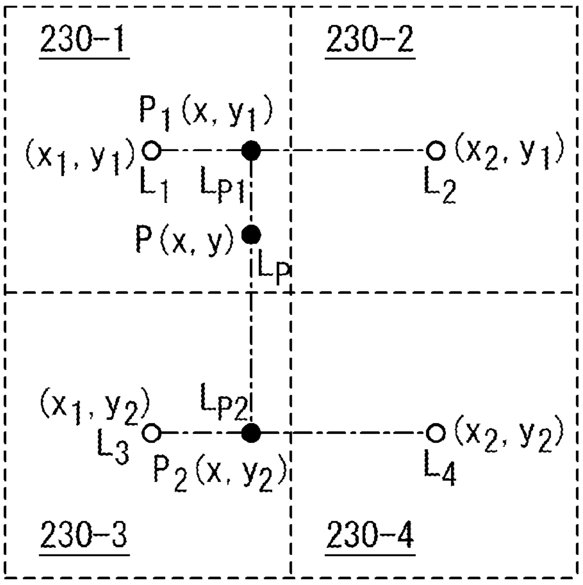
FIG. 11C shows example interpolation for the determination of an interpolated target brightness level for a target pixel, according to one or more embodiments.

The compensation coefficient determination circuit 326 may further determine an interpolated target brightness level for the target pixel by interpolating the target brightness levels for the nearby zones based on the position of the target pixel. FIG. 11C shows an example of interpolation for determining the interpolated target brightness level for the target pixel, according to one or more embodiments. In FIG. 11C, (x, y) is the coordinates of the target pixel P. Further, $(x_1, y_1)$ is the coordinates of the geometric center of the nearby zone 230-1, $(x_2, y_1)$ is the coordinates of the geometric center of the nearby zone 230-2, $(x_1, y_2)$ is the coordinates of the geometric center of the nearby zone 230-3, and $(x_2, y_2)$ is the coordinates of the geometric center of the nearby zone 230-4. $L_1$, $L_2$, $L_3$, and $L_4$ are the target brightness levels for the nearby zones 230-1, 230-2, 230-3, and 230-4, respectively.

In one or more embodiments, a horizontal interpolation is first implemented to compute horizontally-interpolated target brightness levels $L_{P1}$ and $L_{P2}$ for intermediate points $P_1(x, y_1)$ and $P_2(x, y_2)$, and a vertical interpolation is then implemented to compute the interpolated target brightness level $L_P$ for the target pixel P. In one implementation, the horizontally-interpolated target brightness levels $L_{P1}$ and $L_{P2}$ may be computed according to the following equations (1a) and (1b):

$$L_{P1} = \frac{x_2 - x}{x_2 - x_1}L_1 + \frac{x - x_1}{x_2 - x_1}L_2, \text{ and} \tag{1a}$$

$$L_{P2} = \frac{x_2 - x}{x_2 - x_1}L_3 + \frac{x - x_1}{x_2 - x_1}L_4. \tag{1b}$$

In this case, the interpolated target brightness level $L_P$ for the target pixel P may be calculated in accordance with the following equation (2):

$$L_P = \frac{y - y_2}{y_1 - y_2}L_{P1} + \frac{y_1 - y}{y_1 - y_2}L_{P2}. \tag{2}$$

In alternative embodiments, a vertical interpolation may be first implemented and a horizontal interpolation may be then implemented to calculate the interpolated target brightness level $L_P$ for the target pixel P in a similar manner.

In one or more embodiments, the compensation coefficient for the target pixel may be determined based on the interpolated target brightness level $L_P$ for the target pixel P. In one implementation, the compensation coefficient may be determined by normalizing the interpolated target brightness level $L_P$ to a value between 0 and the maximum target brightness level (e.g., 255), i.e., by dividing interpolated target brightness level $L_P$ by the maximum target brightness level. The thus-determined compensation coefficient for the target pixel may be used to generate the output pixel data for the target pixel as shown in FIG. 9. The output pixel data for the target pixel may be generated by applying the compensation coefficient determined for the target pixel. In one implementation, the output pixel data for the target pixel may be generated by multiplying the input pixel data for the target pixel by the compensation coefficient determined for the target pixel. The target pixel may be updated by the driver circuitry 330 based on the output pixel data for the target pixel.

Figure 12:
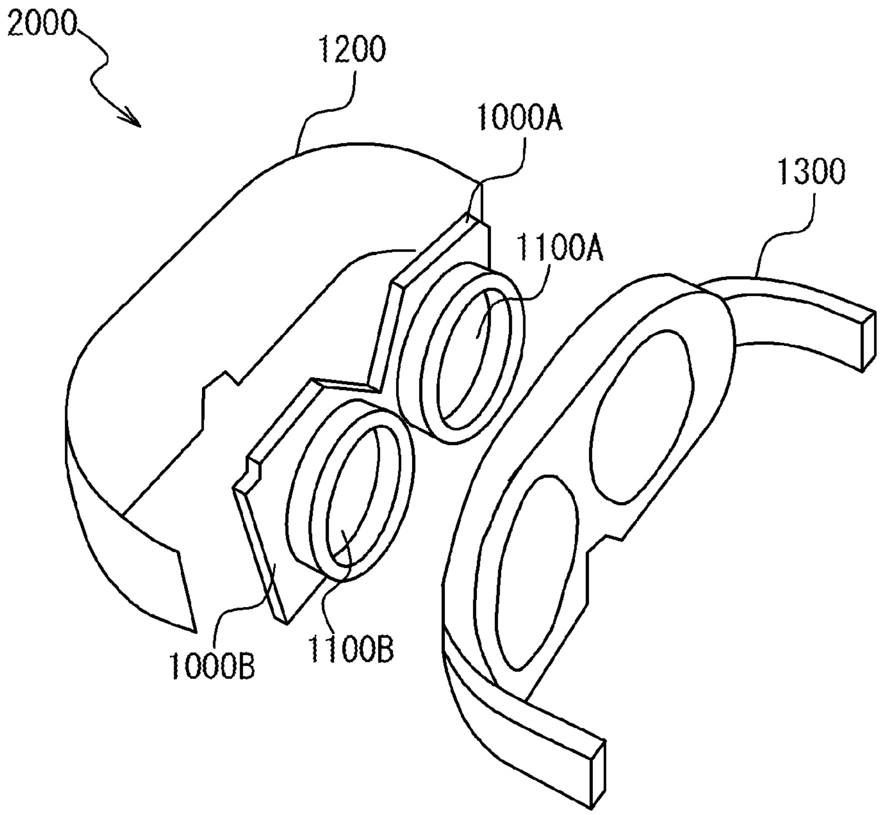
FIG. 12 shows an example head mounted display (HMD) device 2000, according to one or more embodiments.

The display device 1000 described in relation to FIGS. 1 to 11 may be suitably used in an HMD device. FIG. 12 shows an example HMD device 2000, according to one or more embodiments. The HMD device 2000 may be used for an extended reality (XR) application (including virtual reality (VR), augmented reality (AR), and merged reality (MR), among other examples). In the shown embodiment, the HMD device 2000 includes a pair of display devices 1000A and 1000B, a pair of lenses 1100A and 1100B, a cover 1200, and a housing 1300. The display devices 1000A and 1000B are each configured similarly to the display device 1000 described in relation to FIGS. 1 to 11. The display devices 1000A and 1000B are accommodated in the space provided between the cover 1200 and the housing 1300, and the lenses 1100A and 1100B are placed in front of the display devices 1000A and 1000B, respectively. In use, the user views display images displayed on the display devices 1000A and 1000B through the lenses 1100A and 1100B.

Figure 13:
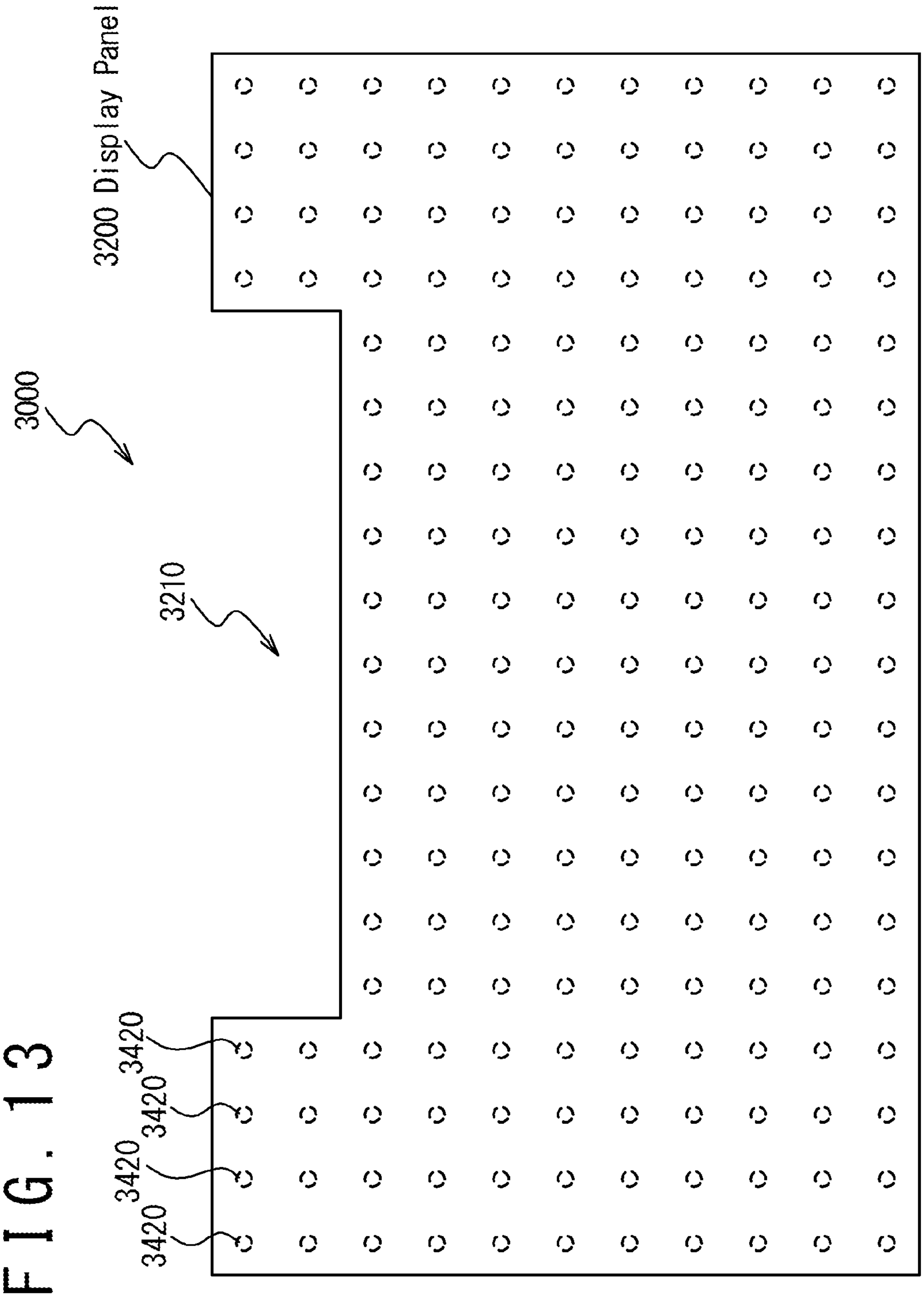
FIG. 13 shows another embodiment based on a display device configured differently from the display device shown in FIG. 2.

The shape of the display panel and the arrangement of the light sources are not limited to the embodiments described above in relation to FIGS. 1-11. FIG. 13 shows another embodiment based on a display device 3000 configured differently from the display device 1000 shown in FIG. 2. In the shown embodiment, the display device 3000 includes a display panel 3200 configured differently from the display panel 200 shown in FIG. 2. The display panel 3200 may be a light-transmissive display panel, such as an LCD panel.

In the shown embodiment, the display panel 3200 is in a rectangular shape with a notch 3210. In one implementation, the display panel 3200 may be used for an automotive application, such as a central console display or other automotive displays. The display panel 3200 may be illuminated by a backlight module with an array of light sources 3420. The array of the light source 3420 is a rectangular array with a notch in accordance with the shape of the display panel 3200.

Figure 14:
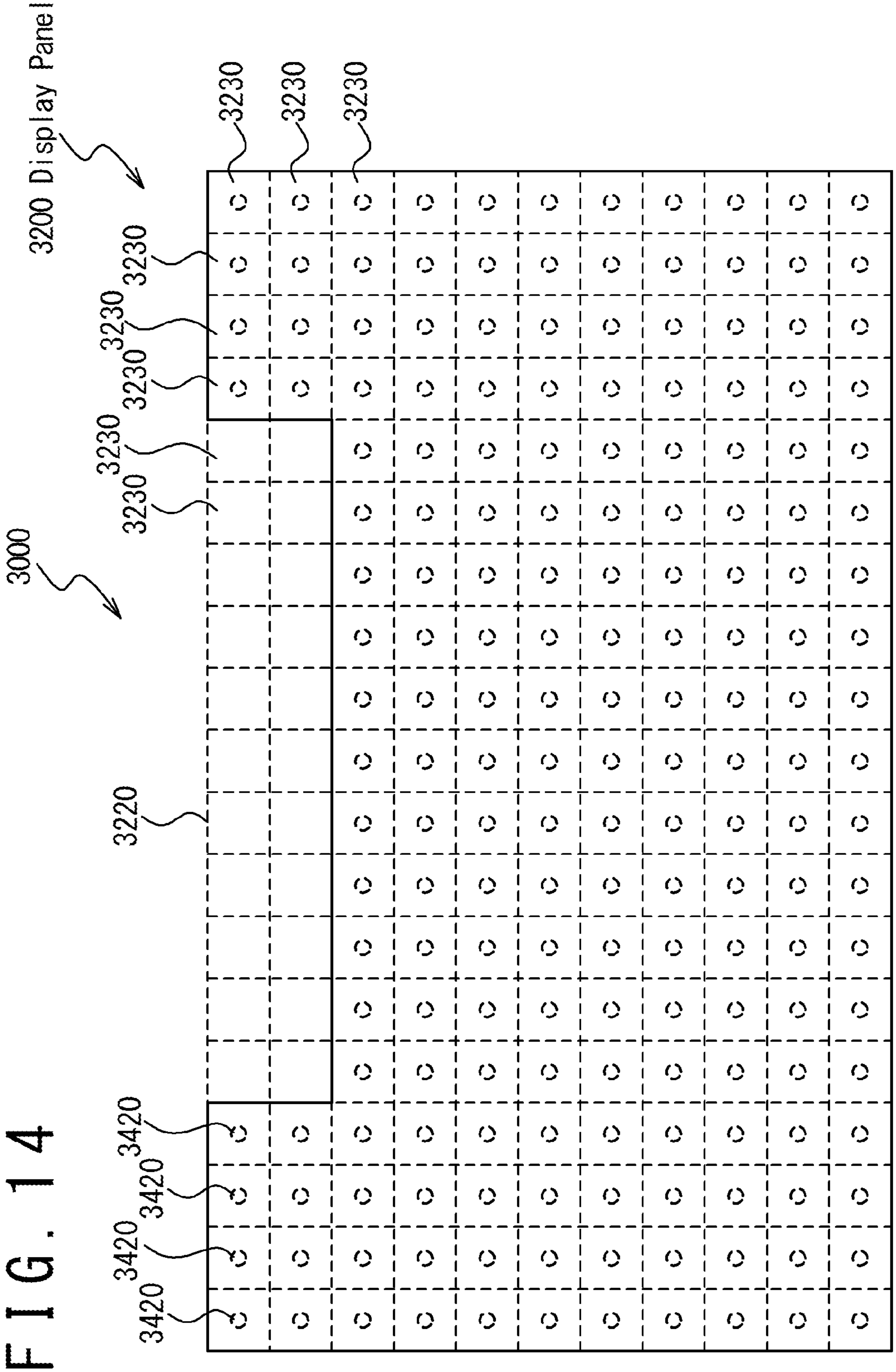
FIG. 14 shows an example definition of "zones" for a display panel, according to one or more embodiments.

Similarly to the embodiments described in relation to FIGS. 1 to 11, as shown in FIG. 14, a plurality of zones 3230 may be defined for the display panel 3200 in one or more embodiments. In the shown embodiment, the zones 3230 are defined by partitioning a panel-circumscribing area 3220 that is defined to circumscribe the display panel 3200. Each zone 3230 is defined such that one light source 3420 opposes to the zone 3230 at the center (e.g., the geometric center) of the zone 3230 or no light source opposes to the zone 3230. In the shown embodiment, there are 12 zones 3230 to which no light sources oppose in the notch of the display panel 3200.

To achieve pixel luminance compensation in a similar manner to the above-described embodiments, light source arrangement types are determined for the respective zones 3230. FIGS. 15A, 15B, 15C, 15D, 15E and 15F show example light source arrangement types defined for the zones 3230 of the display panel 3200, according to one or more embodiments. In the shown embodiment, one of six light source arrangement types shown in FIGS. 15A to 15F are selected and defined for each zone 3230. In one implementation, the light source arrangement type of a zone 3230 of interest is based on presence or absence of a light source 3420 that opposes the zone 3230 of interest. The light source arrangement type of the zone 3230 of interest may further be based on the arrangement of light sources 3420 that oppose zones 3230 adjacent to the zone 3230 of interest.

Figure 15A:
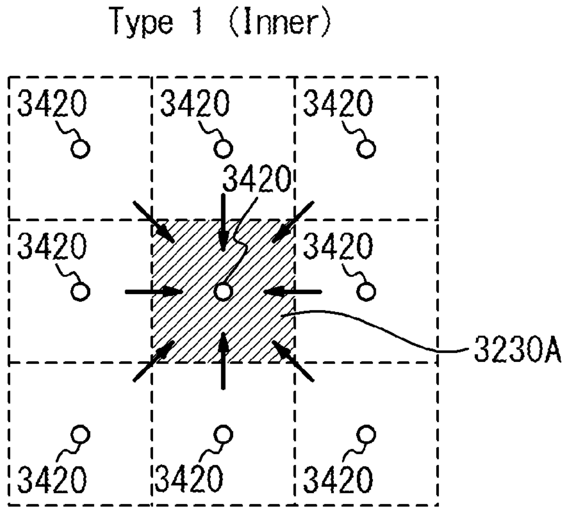
FIGS. 15A, 15B, 15C, 15D, 15E, and 15F show example light source arrangement types defined for zones of a display panel, according to one or more embodiments.

FIG. 15A shows light source arrangement type "Inner", also referred to as type "1" defined for a zone 3230A located in the inner part of the display panel 3200. Type "1" indicates that one light source 3420 opposes to the zone 3230A and eight light sources 3420 oppose to the eight zones adjacent to the zone 3230A. The pixels in the type "1" zone 3230A are mainly illuminated by the light source 3420 that opposes to the zone 3230A and supplementarily illuminated by the eight light sources 3420 that oppose to the eight zones around the type "1" zone 3230A.

Figure 15B:
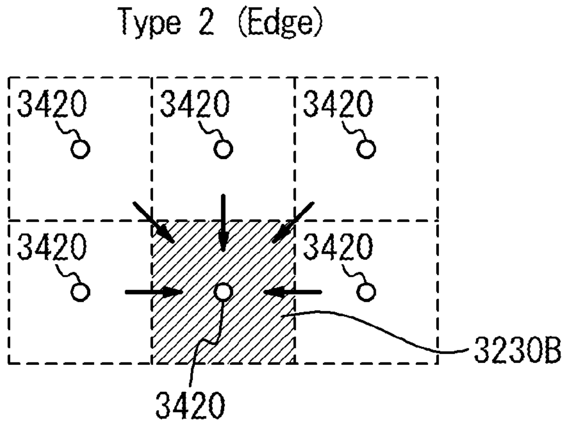

FIG. 15B shows light source arrangement type "Edge", also referred to as type "2", defined for a zone 3230B located at an edge of the display panel 3200. Type "2" indicates that one light source 3420 opposes to the zone 3230B and five light sources 3420 oppose the five zones adjacent to the zone 3230B. The pixels in the type "2" zone 3230B are mainly illuminated by the light source 3420 opposed to the zone 3230B and supplementarily illuminated by the five light sources 3420 that oppose to the five zones around the type "2" zone 3230B.

Figure 15C:
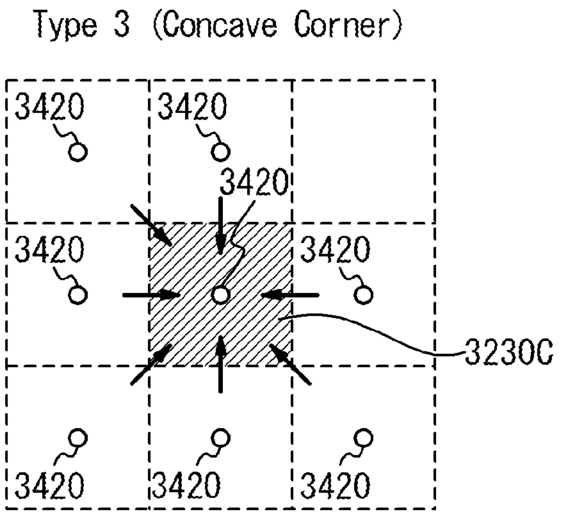

FIG. 15C shows light source arrangement type "Concave Corner", also referred to as type "3", defined for a zone 3230C located at a concave corner of the display panel 3200. Type "3" indicates that one light source 3420 opposes to the zone 3230C and seven light sources 3420 oppose the seven zones adjacent to the zone 3230C. The pixels in the type "3" zone 3230C are mainly illuminated by the light source 3420 opposed to the zone 3230C and supplementarily illuminated by the seven light sources 3420 that oppose to the seven zones around the type "3" zone 3230C.

Figure 15D:
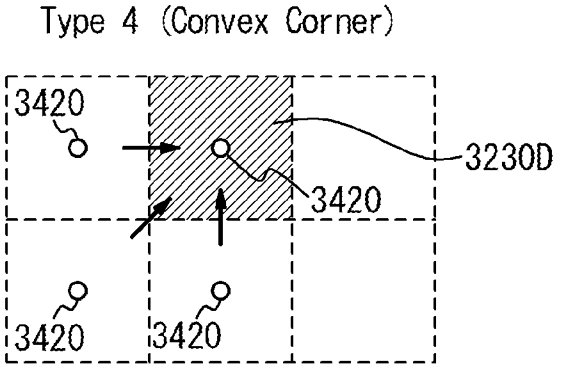

FIG. 15D shows light source arrangement type "Convex Corner", also referred to as type "4", defined for a zone 3230D located at a convex corner of the display panel 3200. Type "4" indicates that one light source 3420 opposes to the zone 3230D and three light sources 3420 oppose the three zones adjacent to the zone 3230D. The pixels in the type "4" zone 3230D are mainly illuminated by the light source 3420 opposed to the zone 3230D and supplementarily illuminated by the three light sources 3420 that oppose to the three zones around the type "4" zone 3230D.

Figure 15E:
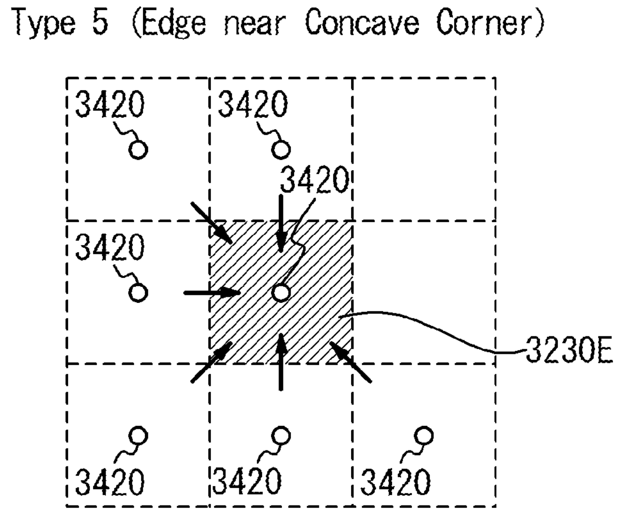

FIG. 15E shows light source arrangement type "Edge near Concave Corner", also referred to as type "5", defined for a zone 3230E located at an edge near a concave corner of the display panel 3200. Type "5" indicates that one light source 3420 opposes to the zone 3230E and six light sources 3420 oppose the six zones adjacent to the zone 3230E. The pixels in the type "5" zone 3230E are mainly illuminated by the light source 3420 opposed to the zone 3230E and supplementarily illuminated by the six light sources 3420 that oppose to the six zones around the type "5" zone 3230C.

Figure 15F:
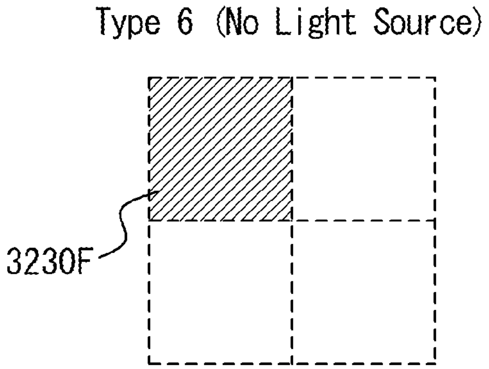

FIG. 15F shows light source arrangement type "No Light Source", also referred to as type "6", defined for a zone 3230F to which no light source opposes. Type "6" indicates absence of a light source that opposes to the zone 3230F. The pixels in the type "6" zone 3230F are illuminated by one or more light sources 3420 that oppose to zones adjacent to the type "6" zone 3230F, if such light sources 3420 exist.

Figure 16:
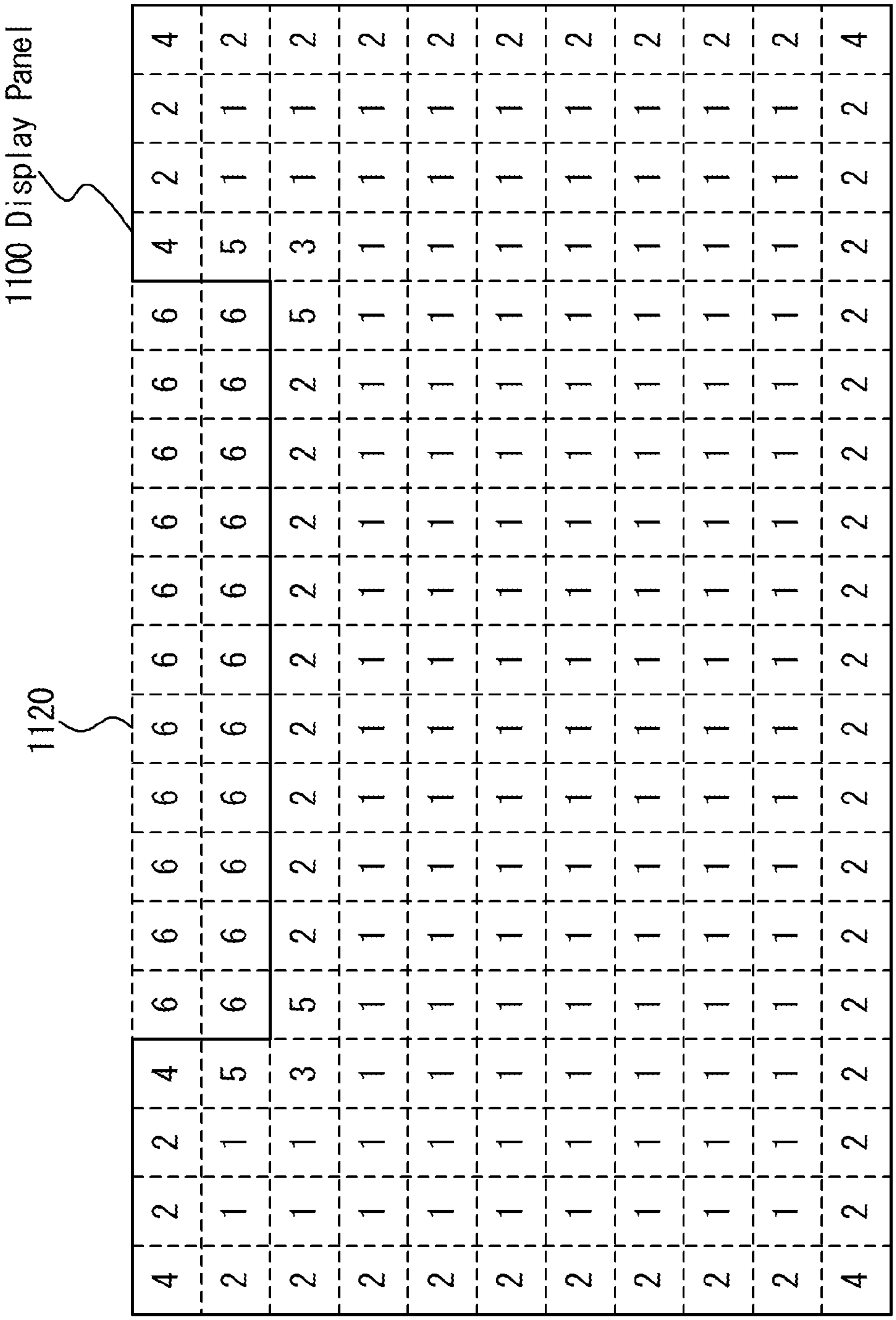
FIG. 16 shows an example definition of light source arrangement types of respective zones of a display panel, according to one or more embodiments.

FIG. 16 shows an example definition of the light source arrangement types of the respective zones 3230 of display panel 3200 in accordance to FIGS. 15A-15F, according to one or more embodiments. In one or more embodiments, the pixel luminance compensation is achieved based on the light source arrangement types determined for the respective zones 3230 similarly to the above-described embodiments.

Figure 17:
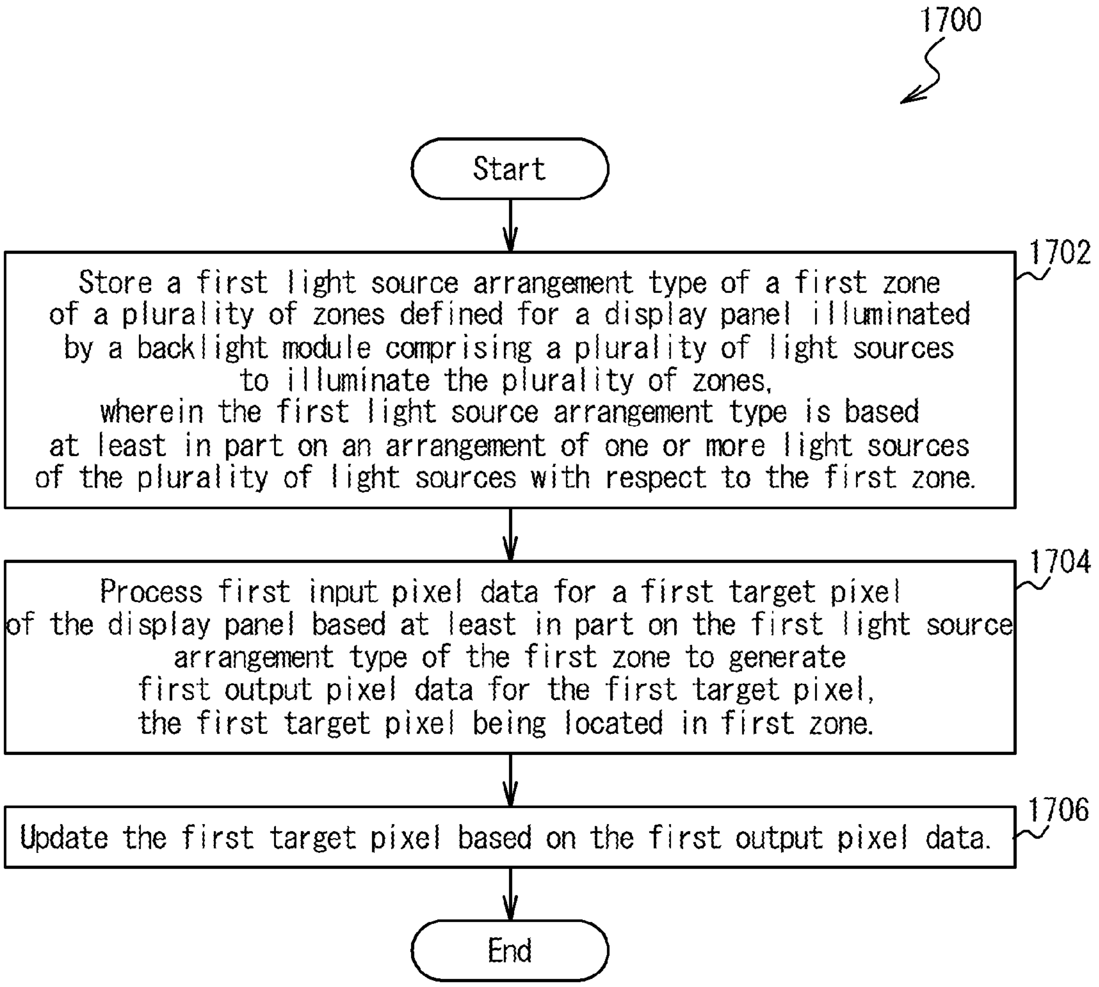
FIG. 17 shows a flowchart depicting an example method for pixel luminance compensation, according to one or more embodiments.

FIG. 17 shows a flowchart depicting an example method 1700 for pixel luminance compensation, according to one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 17.

The method 1700 includes storing, at step 1702, a first light source arrangement type of a first zone of a plurality of zones (e.g., the zones 230 shown in FIG. 5 and the zones 3230 shown in FIG. 14) defined for a display panel (e.g., the display panel 200 shown in FIG. 2 and the display panel 3200 shown in FIG. 13) illuminated by a backlight module (e.g., the display module 400 shown in FIG. 4). The backlight module includes a plurality of light sources (e.g., the light sources 420 shown in FIG. 2 and the light sources 3420 shown in FIG. 13) that illuminate the plurality of zones. The first light source arrangement type is based at least in part on an arrangement of one or more light sources of the plurality of light sources with respect to the first zone. In one implementation, the first light source arrangement type may be selected from among types "1" to "4" shown in FIGS. 7A-7D, respectively. In another implementation, the first light source arrangement type may be selected from among types "1" to "6" shown in FIGS. 15A-15F, respectively.

The method 1700 further includes processing, at step 1704, first input pixel data for a first target pixel of the display panel based at least in part on the first light source arrangement type of the first zone to generate first output pixel data for the first target pixel. The first target pixel is located in the first zone. In one implementation, a compensation coefficient may be determined for the first target pixel based at least in part on the first light source arrangement type of the first zone and the compensation coefficient may be applied to the first input pixel data to generate the first output pixel data.

The method 1700 further includes updating the first target pixel based on the first output pixel data at step 1706. In one implementation, the first output pixel data may be further processed (e.g., for achieving color adjustment, demura correction, deburn correction, image scaling, gamma transformation, or other image processes) to generate processed pixel data and the update of the first target pixel may be based on the processed pixel data.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display device, comprising:

a display panel;

a backlight module comprising a plurality of light sources to illuminate a plurality of zones defined for the display panel; and a display driver configured to:

store a first light source arrangement type of a first zone of the plurality of zones, wherein the first light source arrangement type is based at least in part on an arrangement of one or more light sources of the plurality of light sources with respect to the first zone, process first input pixel data for a first target pixel of the display panel based at least in part on the first light source arrangement type of the first zone to generate first output pixel data for the first target pixel, the first target pixel being located in the first zone, and update the first target pixel based on the first output pixel data.

2. The display device of claim 1, wherein a first set of light sources of the plurality of light sources oppose a first set of zones of the plurality of zones, respectively, the first set of zones being adjacent to the first zone, and wherein the first light source arrangement type is based at least in part on an arrangement of the first set of light sources.

3. The display device of claim 2, wherein the first light source arrangement type is based at least in part on a number of light sources of the first set of light sources.

4. The display device of claim 1, wherein processing the first input pixel data for the first target pixel comprises generating the first output pixel data such that a gray level of the first output pixel data for the first target pixel is less than a gray level of the first input pixel data for the first target pixel in response to the first light source arrangement type of the first zone indicating presence of a light source that opposes the first zone.

5. The display device of claim 1, wherein at least one of the plurality of zones are defined such that no light sources oppose the at least one of the plurality of zones.

6. The display device of claim 1, wherein a second zone of the plurality of zones is defined such that no light sources oppose the second zone, and wherein the display driver is further configured to:

store a second light source arrangement type of the second zone, wherein the second light source arrangement type of the second zone indicates absence of a light source that opposes the second zone, process second input pixel data for a second target pixel of the display panel based on the second light source arrangement type of the second zone to generate second output pixel data for the second target pixel, the second target pixel being located in the second zone, and update the second target pixel based on the second output pixel data.

7. The display device of claim 6, wherein processing the second input pixel data for the second target pixel comprises determining the second output pixel data to be equal to the second input pixel data in response to the second light source arrangement type of the second zone indicating absence of a light source that opposes the second zone.

8. The display device of claim 1, wherein the display driver is further configured to store a second light source arrangement type of a second zone of the plurality of zones, the second zone being adjacent to the first zone, wherein the second light source arrangement type is based at least in part on an arrangement of one or more light sources of the plurality of light sources with respect to the second zone, and wherein processing the first input pixel data for the first target pixel is further based on the second light source arrangement type of the second zone.

9. The display device of claim 1, wherein processing the input pixel data for the first target pixel comprises:

determining a compensation coefficient for the first target pixel based at least in part on the first light source arrangement type of the first zone; and applying the compensation coefficient to the first input pixel data to generate the first output pixel data.

10. The display device of claim 9, wherein determining the compensation coefficient for the first target pixel comprises:

determining a first target brightness level for the first zone based at least in part on the first light source arrangement type; and determining the compensation coefficient for the first target pixel based at least in part on the first target brightness level.

11. The display device of claim 9, wherein the display driver is further configured to store a second light source arrangement type of a second zone of the plurality of zones, the second zone being adjacent to the first zone, wherein the second light source arrangement type is based at least in part on an arrangement of one or more light sources of the plurality of light sources with respect to the second zone, wherein determining the compensation coefficient for the first target pixel is further based on the second light source arrangement type.

12. The display device of claim 11, wherein determining the compensation coefficient for the first target pixel comprises:

determining a first target brightness level for the first zone based at least in part on the first light source arrangement type;

determining a second target brightness level for the second zone based at least in part on the second light source arrangement type;

determining an interpolated target brightness level based at least in part on the first target brightness level, the second target brightness level, and a location of the first target pixel; and determining the compensation coefficient based at least in part on the interpolated target brightness level.

13. A display driver, comprising:

a light source brightness compensation circuit configured to:

store a first light source arrangement type of a first zone of a plurality of zones defined for a display panel illuminated by a backlight module comprising a plurality of light sources to illuminate the plurality of zones, wherein the first light source arrangement type is based at least in part on an arrangement of one or more light sources of the plurality of light sources with respect to the first zone, and process first input pixel data for a first target pixel of the display panel based at least in part on the first light source arrangement type of the first zone to generate first output pixel data for the first target pixel, the first target pixel being located in the first zone, and driver circuitry configured to update the first target pixel based on the first output pixel data.

14. The display driver of claim 13, wherein a first set of light sources of the plurality of light sources oppose a first set of zones of the plurality of zones, respectively, the first set of zones being adjacent to the first zone, wherein the first light source arrangement type is based at least in part on an arrangement of the first set of light sources.

15. The display driver of claim 13, wherein at least one of the plurality of zones are defined such that no light sources oppose the at least one of the plurality of zones.

16. The display driver of claim 13, wherein a second zone of the plurality of zones is defined such that no light sources oppose the second zone, and wherein the light source brightness compensation circuit is further configured to:

store a second light source arrangement type of the second zone, wherein the second light source arrangement type of the second zone indicates absence of a light source that opposes the second zone, process second input pixel data for a second target pixel of the display panel based on the second light source arrangement type of the second zone to generate second output pixel data for the second target pixel, the second target pixel being located in the second zone, and update the second target pixel based on the second output pixel data.

17. The display driver of claim 13, wherein the light source brightness compensation circuit is further configured to store a second light source arrangement type of a second zone of the plurality of zones, the second zone being adjacent to the first zone, wherein the second light source arrangement type is based at least in part on an arrangement of one or more light sources of the plurality of light sources with respect to the second zone, wherein processing the first input pixel data for the first target pixel is further based on the second light source arrangement type of the second zone.

18. A method, comprising:

storing a first light source arrangement type of a first zone of a plurality of zones defined for a display panel illuminated by a backlight module comprising a plurality of light sources to illuminate the plurality of zones, wherein the first light source arrangement type is based at least in part on an arrangement of one or more light sources of the plurality of light sources with respect to the first zone, and processing first input pixel data for a first target pixel of the display panel based at least in part on the first light source arrangement type of the first zone to generate first output pixel data for the first target pixel, the first target pixel being located in the first zone, and updating the first target pixel based on the first output pixel data.

19. The method of claim 18, wherein a first set of light sources of the plurality of light sources oppose a first set of zones of the plurality of zones, respectively, the first set of zones being adjacent to the first zone, and wherein the first light source arrangement type is based at least in part on an arrangement of the first set of light sources.

20. The method of claim 18, wherein a second zone of the plurality of zones is defined such that no light sources oppose the second zone, and wherein the method further comprises:

storing a second light source arrangement type of the second zone, wherein the second light source arrangement type of the second zone indicates absence of a light source that opposes the second zone;

processing second input pixel data for a second target pixel of the display panel based on the second light source arrangement type of the second zone to generate second output pixel data for the second target pixel, the second target pixel being located in the second zone; and updating the second target pixel based on the second output pixel data.

* * * * *